(12) United States Patent
Lyders et al.

(10) Patent No.: US 10,935,046 B2
(45) Date of Patent: Mar. 2, 2021

(54) INTEGRALLY BUILT UP COMPOSITE FAN CASE

(71) Applicant: United Technologies Corporation, Farmington, CT (US)

(72) Inventors: David R. Lyders, Middletown, CT (US); Colin J. Kling, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 302 days.

(21) Appl. No.: 15/957,432

(22) Filed: Apr. 19, 2018

(65) Prior Publication Data
US 2019/0323520 A1 Oct. 24, 2019

(51) Int. Cl.
| | |
|---|---|
| *F01D 25/28* | (2006.01) |
| *F04D 29/52* | (2006.01) |
| *B32B 5/02* | (2006.01) |
| *B32B 5/26* | (2006.01) |
| *B32B 7/12* | (2006.01) |
| *B32B 15/14* | (2006.01) |
| *F04D 29/02* | (2006.01) |

(52) U.S. Cl.
CPC ............. *F04D 29/526* (2013.01); *B32B 5/02* (2013.01); *B32B 5/26* (2013.01); *B32B 7/12* (2013.01); *B32B 15/14* (2013.01); *F04D 29/023* (2013.01); *B32B 2250/05* (2013.01); *B32B 2250/44* (2013.01); *B32B 2262/101* (2013.01); *B32B 2262/106* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 8,475,895 B2 | 7/2013 | Xie | |
| 8,740,558 B2 | 6/2014 | Robertson, Jr. et al. | |
| 8,979,473 B2 | 3/2015 | Lussier et al. | |
| 9,296,189 B2 | 3/2016 | Ralfs et al. | |
| 2009/0010755 A1 | 1/2009 | Keller et al. | |
| 2011/0052383 A1 | 3/2011 | Lussier | |
| 2014/0286769 A1 | 9/2014 | Otsu | |
| 2015/0013143 A1* | 1/2015 | Mathon | B29C 70/68 29/525.11 |
| 2016/0201505 A1 | 7/2016 | Clarkson et al. | |
| 2017/0198714 A1 | 7/2017 | Lin et al. | |
| 2018/0050469 A1 | 2/2018 | Goering | |
| 2019/0211705 A1 | 7/2019 | Kling | |

FOREIGN PATENT DOCUMENTS

| | | |
|---|---|---|
| FR | 3045456 A1 | 6/2017 |
| FR | 3045448 B1 | 1/2018 |

OTHER PUBLICATIONS

EP search report for EP19170333.9 dated Aug. 28, 2019.

\* cited by examiner

*Primary Examiner* — Kayla McCaffrey
(74) *Attorney, Agent, or Firm* — Getz Balich LLC (57) ABSTRACT

A gas turbine engine fan case may comprise a plurality of wound layers that form a laminate and have a nominal radial fan case thickness, where the laminate includes a plurality of discrete fan case radial locations comprising a plurality of radially stacked composite plies that form a radial integral build up in comparison to the nominal radial fan case thickness.

8 Claims, 7 Drawing Sheets

INTEGRALLY BUILT UP COMPOSITE FAN CASE

BACKGROUND OF THE INVENTION

1. Technical Field

The present disclosure relates to a composite fan case for a gas turbine engine and, more particularly to a composite fan case that includes discrete plies or fillers that are integrally incorporated into laminate of the composite fan to provide discrete build-ups within the laminate that can be used to provide, for example, attachment points for external hardware.

2. Background Information

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In a continued effort to reduce the weight of a gas turbine engine, a case surrounding the fan rotor has been manufactured of a composite material, such as carbon epoxy, to further reduce weight. Although composite fan cases are light weight and include several other favorable characteristics, one challenge with composite fan cases is attaching components to the case. In general, components have been bonded to the external surface of the fan case or attached with threaded fasteners extending through the case. However, bonded features tend to be liberated in a Fan Blade Out (FBO) event, and threaded fasteners through the composite material may degrade structural capability of the containment case.

There is a need for an improved composite fan case.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine fan case includes a plurality of wound layers that form a laminate and have a nominal radial fan case thickness, where the laminate includes a plurality of discrete fan case radial locations comprising a plurality of radially stacked composite plies that form a radial integral build up in comparison to the nominal radial fan case thickness.

The plurality of wound layers may comprise composite material and the plurality of radially stacked composite plies may be stacked to form the radial integral build up.

The plurality of radially stacked composite plies may be radially interleaved with the plurality of wound layers.

The plurality of radially stacked composite plies may be stacked face to face to form the radial integral build up.

The plurality of radial integral build ups may include at least one machined radially extending recess.

The machined recess may comprise a threaded metallic hole.

The plies may comprise carbon fiber reinforced structure.

A gas turbine engine fan case may include a plurality of wound layers that form a laminate and have a nominal radial fan case thickness. The laminate may include a plurality of discrete fan case radial locations comprising a plurality of radially stacked composite plies interleaved with the wound layers to form a radial integral build up in comparison to the nominal radial fan case thickness.

The plurality of wound layers may comprise composite material.

The plurality of radially stacked composite plies may be radially interleaved with the plurality of wound layers.

The plurality of radial integral build ups may include at least one machined radially extending recess that contains a threaded metallic recess.

The plies may comprise carbon fiber reinforced structure.

The plurality of wound layers may comprise fiberglass and adhesive.

A gas turbine engine fan case may comprise a plurality of wound layers that form a laminate and have a nominal radial fan case thickness. The laminate may include a plurality of discrete fan case radial locations comprising a discrete filler material sandwiched between radially adjacent layers of the plurality of wound layers to form a radial integral build up in comparison to the nominal radial fan case thickness.

The radial integral build up may comprise a radially extending machined cavity into which is mounted a threaded metallic hole to receive attachment hardware.

The discrete filler may comprise unitary material selected from one of metal or composite.

The plurality of wound layers may comprise composite material and the plies comprise fiberglass.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

Figure 1:
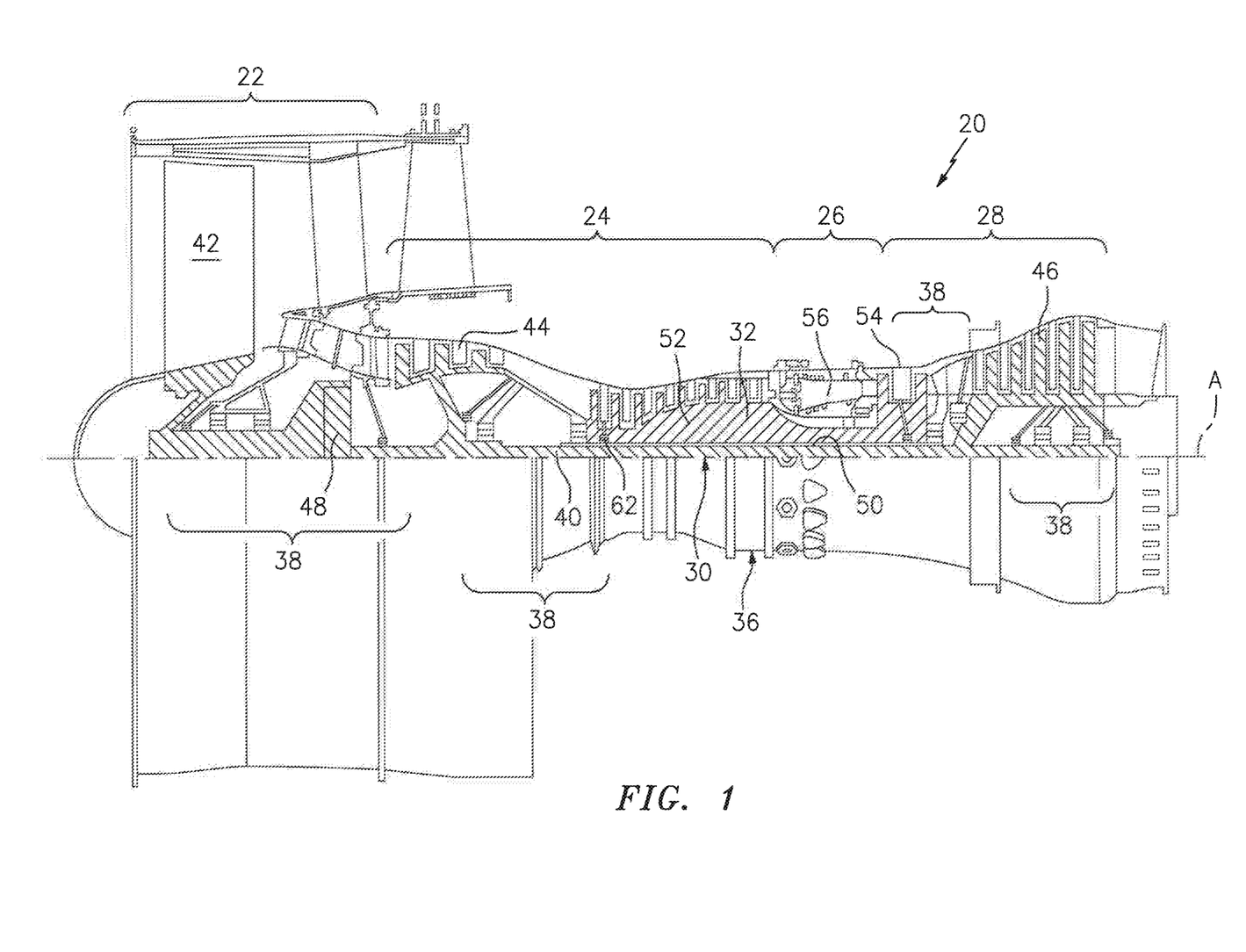
FIG. 1 schematically illustrates a turbofan engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines (not shown) might include an augmentor section among other systems or features. Although depicted as a high-bypass turbofan in the disclosed non-limiting embodiment, it should be appreciated that the concepts described herein are not limited to use only with turbofan architectures as the teachings may be applied to other types of turbine engines such as turbojets, turboshafts, industrial gas turbines, and three-spool (plus fan) turbofans with an intermediate spool.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and high spool 32 in response to the expansion.

Figure 2:
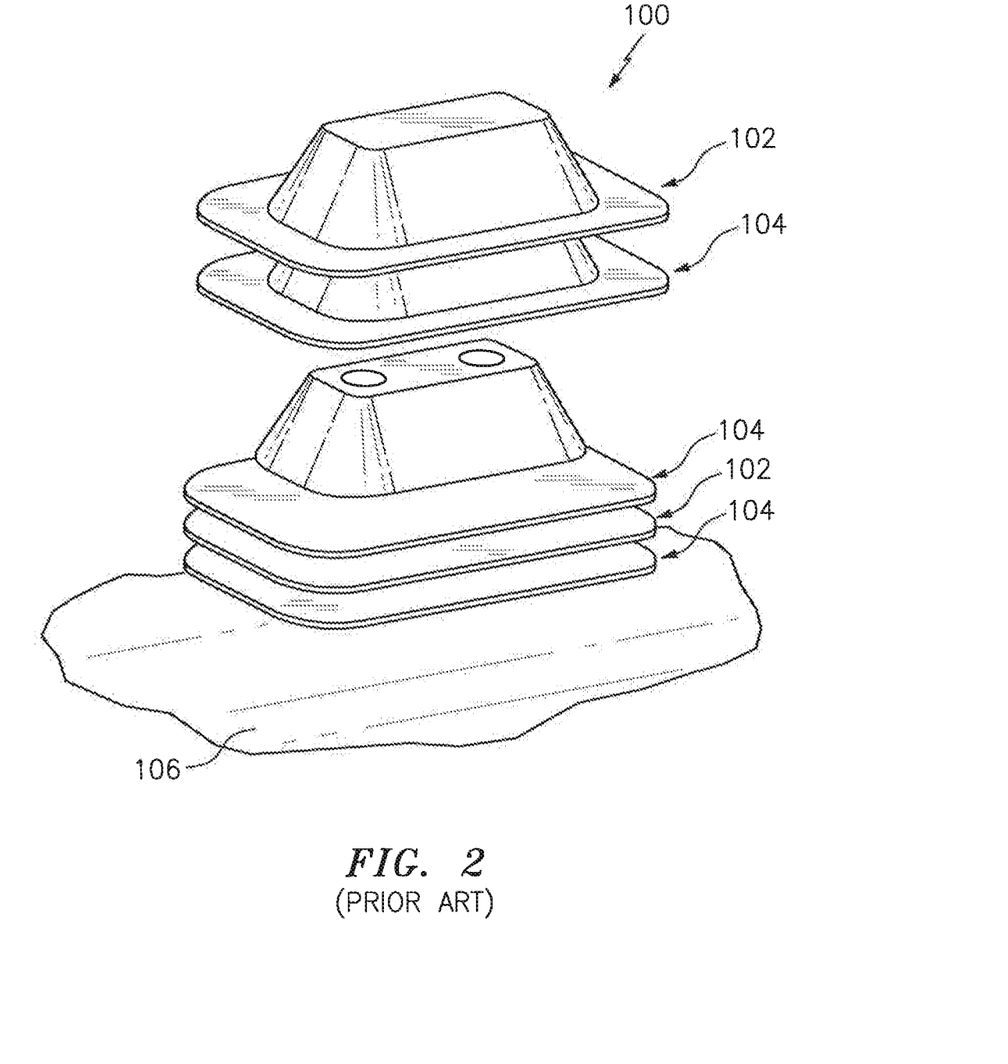
FIG. 2 is a pictorial illustration of a plurality of plies of fiberglass and outer adhesives all attached to a composite fan case, according to the prior art

FIG. 2 is a pictorial illustration of a plurality of fiberglass plies 102 and outer adhesives 104 all attached to a composite fan case exterior surface 106, according to the prior art, to form a thread bolt attachment 100. See U.S. Pat. No. 8,979,373 assigned to the assignee of the present invention and incorporated by reference. The thread bolt attachment 100 may be in the shape of a molded conical "bathtub" or boss. Metal inserts may be imbedded within the bathtub to provide attachment hardware for various components mounted to the exterior of the fan case, including for example a holding bracket for a fluid tube. A problem with this prior art configuration is that it uses secondarily bonded details to create attachment points for external hardware. These details require the fan case to go through a second cure cycle for the adhesive, adding time to the manufacturing process and exposing the fan case to additional temperature cure cycles. To reduce the number of details that are designed/fabricated, a series of common details are typically used; this can result in sub-optimal design solutions (where larger details than needed are used for the sake of commonality) and can limit detail placement (because the secondarily bonded details are typically contoured to match the case diameter). These details are also nonstructural, so they cannot be relied upon to increase the structural capability, for instance around an instrumentation hole. Finally, during a high energy event, such as a containment event, the impulse typically causes the adhesive to fail and liberates the prior art technology detail.

Figure 3:
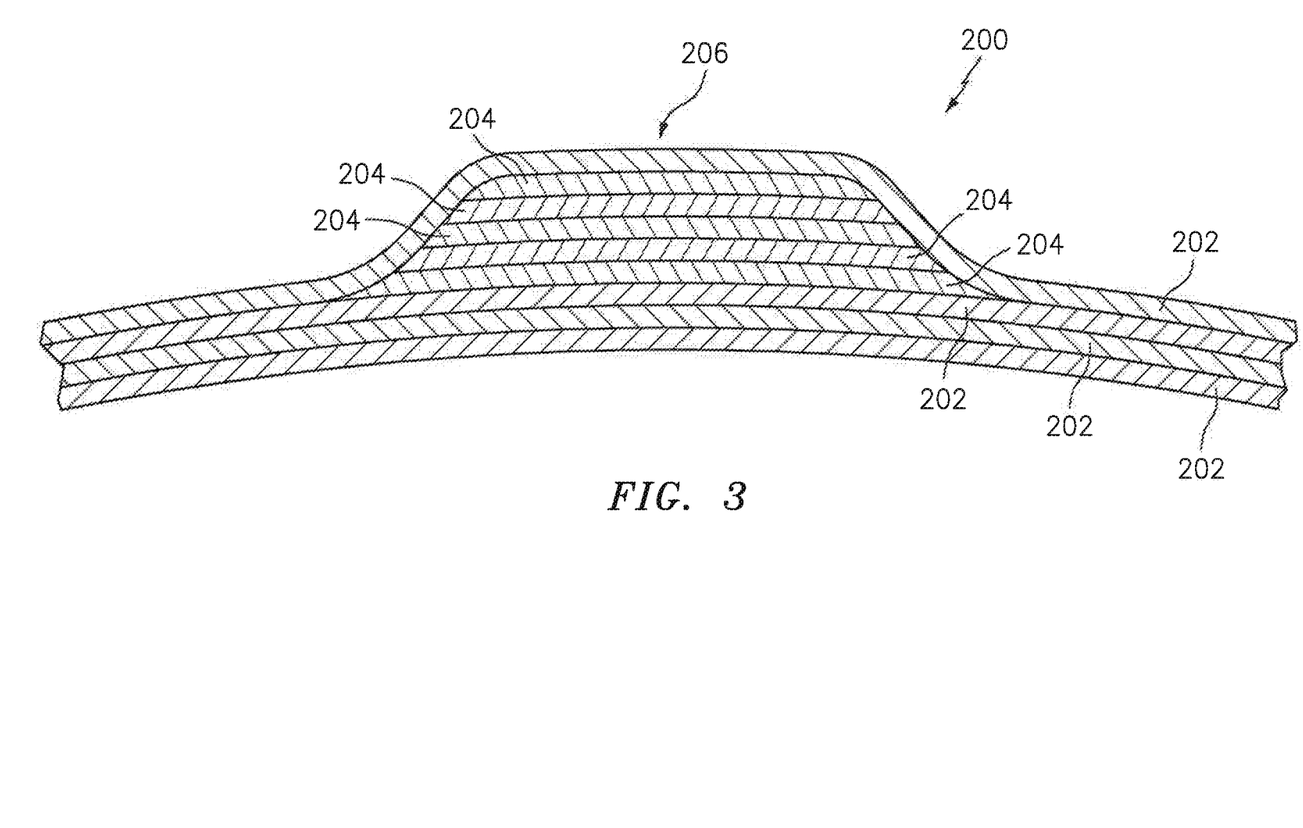
FIG. 3 is a cross-sectional illustration of a portion of a fan case.

FIG. 3 is a cross-sectional illustration of a portion of a fan case 200 during an intermediate step of manufacturing the fan case. In this embodiment the fan case comprises a plurality of wound layers 202 (e.g., layers of composite material) that circumferentially form the fan case and a plurality of radially stacked composite plies 204 that form a radial integral build-up 206. In this embodiment the length of the plurality of radially stacked composite plies 204 generally decreases radially outwardly in order to form, for example, a trapezoidal shaped build-up 206. The dimensions of the stacked composite plies 204 may be selected based upon the desired shape of the build-up 206, such as for example, rectangular, square, oval, et cetera.

The plies 204 may be fiberglass or carbon fiber reinforced, or have other fiber reinforcement. The integral build-up 206 may have a peak thickness $T_p$ which is greater than nominal thickness $T_n$ of the fan case.

Figure 4:
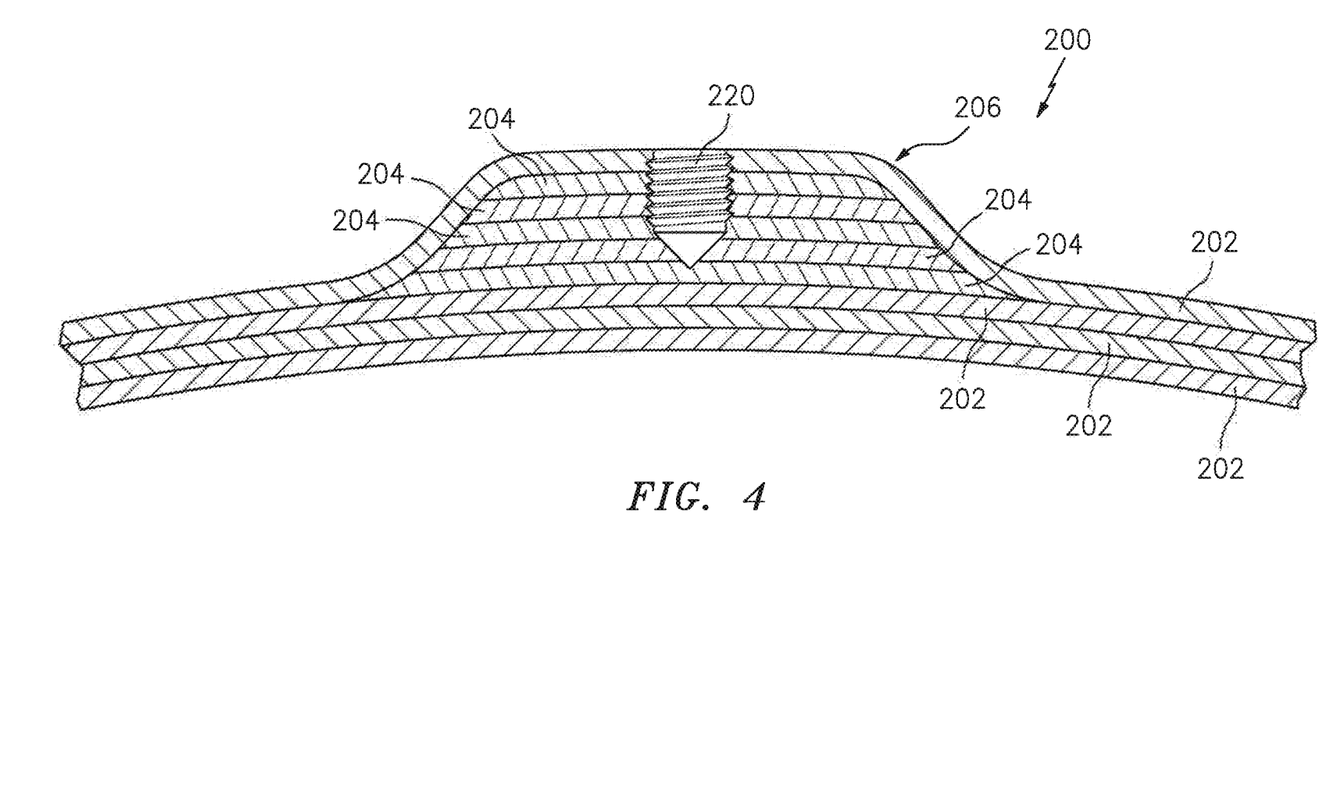
FIG. 4 is a cross-sectional illustration of a portion of the fan case illustrated in FIG. 3, following machining to form a recess in the plies for mounting of attachments.

FIG. 4 is a cross-sectional illustration of the portion of the fan case 200 illustrated in FIG. 3 following machining to form a recess 220 filled by a metallic insert with an attachment feature (e.g., threaded hole) in the insert for mounting of attachments. For example, a bracket (not shown) may the threaded into the insert in order to provide a mounting structure (not shown) extending radially beyond the fan case and onto which components may be attached.

The build-up discussed herein may also be used for local reinforcement to allow holes in a case for future instrumentation, embedding a metallic detail that can later have an insert installed, locally reinforce the laminate for structural reasons, et cetera.

Figure 5:
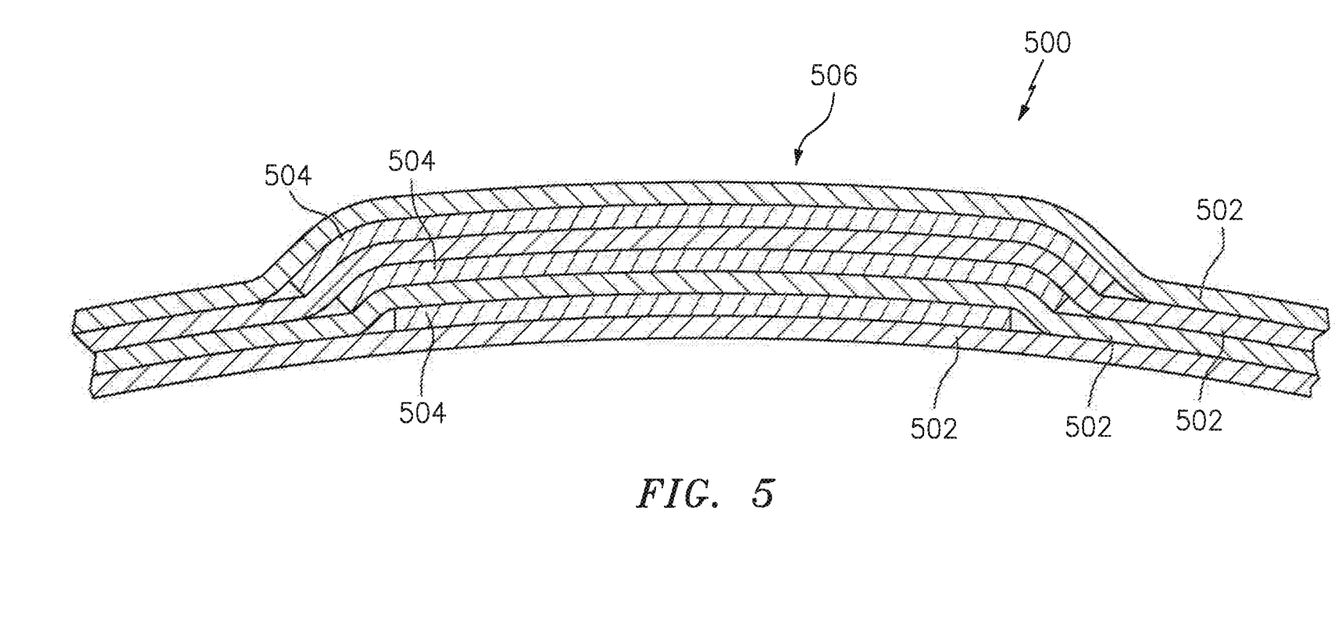
FIG. 5 is a cross-sectional illustration of a portion of a fan case that comprises a plurality of wound layers interleaved with plies to form a radial integral build-up.

Rather than stacking the plurality of plies in order to form the build-up, it is contemplated that other structures/techniques may be used. For example, FIG. 5 is a cross-sectional illustration of a portion of a fan case 500 during an intermediate step of manufacturing the fan case. In this embodiment the fan case comprises a plurality of wound layers 502 that circumferentially form the fan case along with a plurality of radially stacked discrete composite plies 504. In this embodiment the plies are interleaved with the wound layers 502 to form a radial integral build-up 506. The dimensions of the plies 504 is selected based upon the desired shape of the build-up 506. Once the build-up is completed and the fan case structure is cured, the build-up may be machined in order to provide the desired structure for receiving mounting components as discussed above with respect to FIG. 4.

Figure 6:
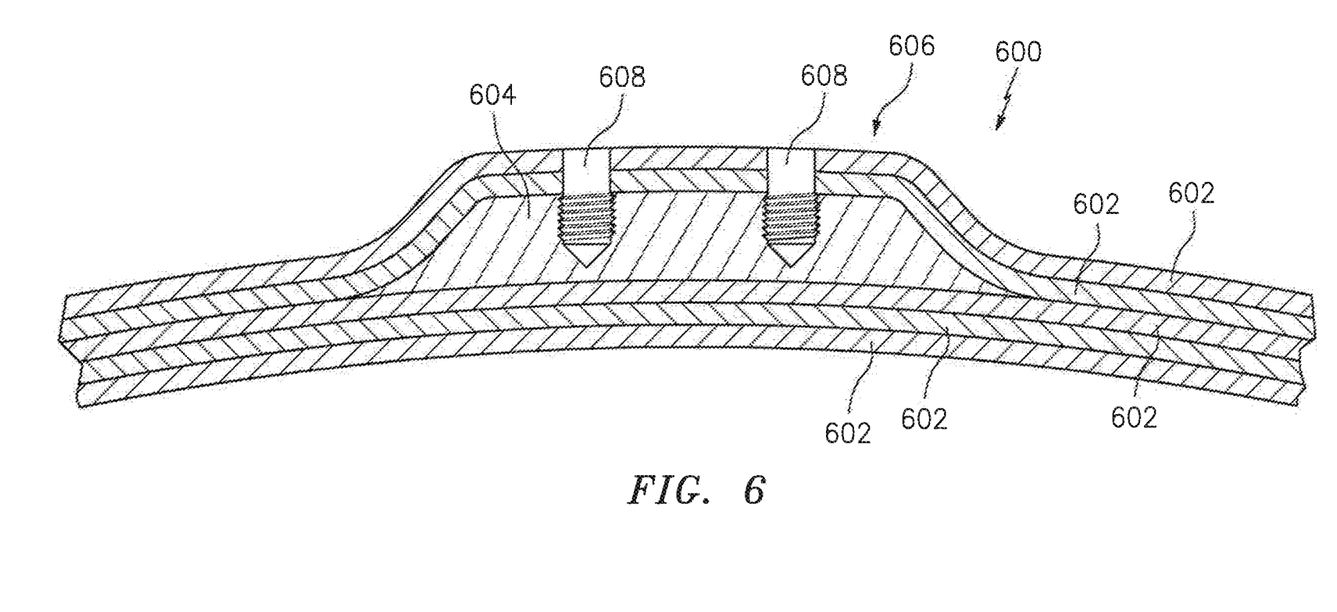
FIG. 6 is a cross-sectional illustration of a portion of a fan case that includes a plurality of wound layers and a discrete filler that form a radial integral build-up.

Rather than face to face stacked plies or interleaved plies to primarily form the build-up, it is contemplated that a discrete filler may be used (e.g., a unitary filler). FIG. 6 is a cross-sectional illustration of a portion of a fan case 600. In this embodiment the fan case comprises a plurality of wound layers 602 that circumferentially form the fan case and a discrete filler 604 that form a radial integral build-up 606. The discrete filler 604 may be metallic, composite, or other materials such as lightweight potting. The dimensions/shape of the discrete filler may be selected based upon the desired shape of the build-up 606. One or more recesses 608 may be machined into the build-up 606 in order to provide structure (e.g., a threaded hole) that receives component mounting elements such as a bracket, et cetera.

Figure 7:
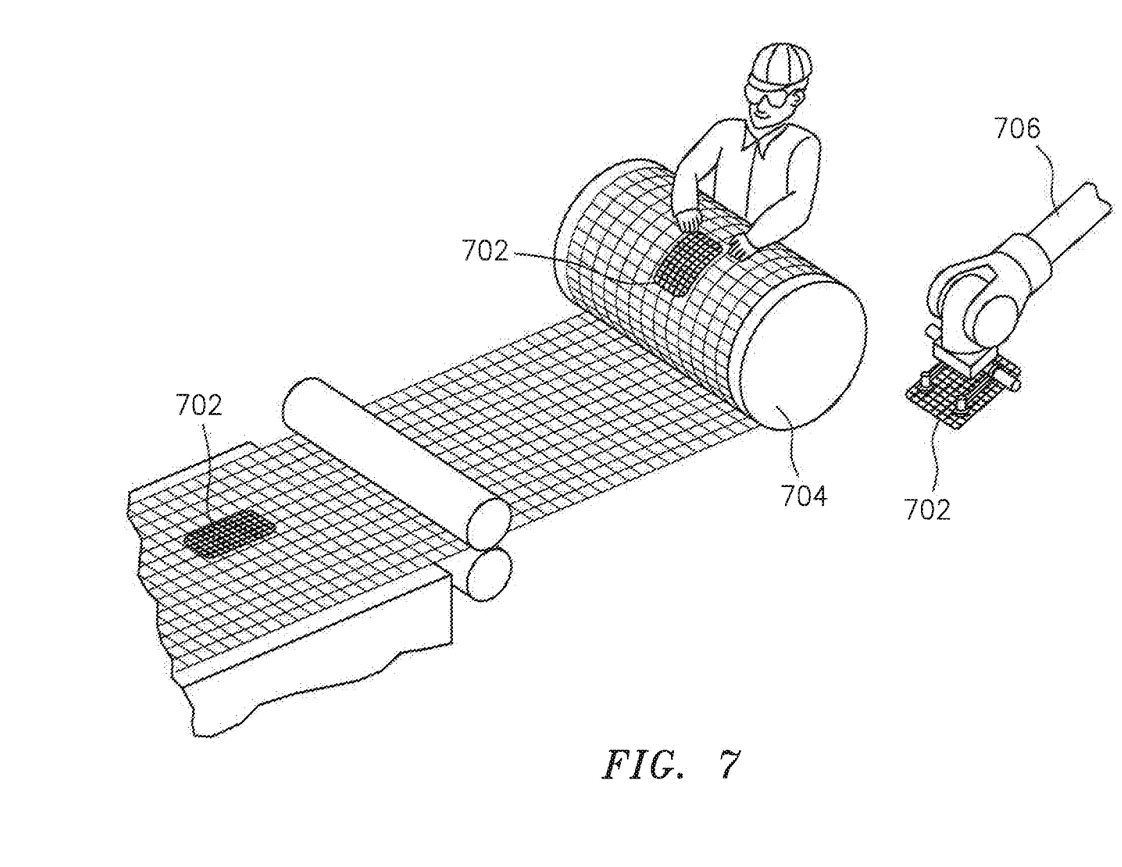
FIG. 7 is a pictorial illustration of plies being placed at specific locations of a roll of composite material.

FIG. 7 is a pictorial illustration of plies or filler 702 being placed at specific locations of a roll of composite material 704, hand placed by an operator, or automated placement using a robotic device 706. The localized build ups can be added to known processes of wrapping of the composite case. The build ups can be used for attachment points for external hardware, local reinforcement to allow holes in a case for future instrumentation, embedding a metallic detail that can later have an insert installed, locally reinforcing the laminate for structural reasons, or other uses for a build up.

Creating the build up using discrete plies or filler material allows each location to be customized for the particular application, and opens the design space to optimize each location to its needs without a series of unique part numbers. Final part weight may be reduced compared to using prior art technology by only splicing in the number of plies that are needed (instead of bonding a common detail sized for the largest need). Secondary bonding process and its associated cure times/temperatures may be eliminated in contrast to the prior art. In addition, during high energy impact events, such as a blade out event, the adhesive bond of the prior art technology can fail, liberating the secondarily bonded details. In contrast, the integrated build up splices with the case laminate so there is no adhesive bond line to fail.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine fan case, comprising:
   a fan case that includes a plurality of wound layers that form a laminate and have a nominal radial fan case thickness, where the laminate includes a plurality of discrete fan case locations each comprising a discrete filler material sandwiched between radially adjacent layers of the plurality of wound layers to form a radial integral build-up in comparison to the nominal radial fan case thickness,
   where the radial integral build-up includes at least one machined radially extending recess defined by a radially extending sidewall extending through and formed by at least one wound layer of the plurality of wound layers and at least a portion of the discrete filler material, and
   where the radially extending sidewall includes a threaded portion.

2. The gas turbine engine fan case of claim 1, where the discrete filler material is a unitary material selected from one of metal or composite.

3. The gas turbine engine fan case of claim 1, where the plurality of wound layers comprises a composite material.

4. The gas turbine engine fan case of claim 1, where the threaded portion of the radially extending sidewall is defined entirely by the discrete filler material.

5. The gas turbine engine fan case of claim 1, where the discrete filler material is a metal material.

6. The gas turbine engine fan case of claim 1, where the discrete filler material is a composite material.

7. The gas turbine engine fan case of claim 1, where the radial integral build-up includes an inner radial side and an outer radial side opposite the inner radial side and where the at least one machined radially extending recess extends a radial distance from the outer radial side which is less than a thickness between the inner radial side and the outer radial side.

8. The gas turbine engine fan case of claim 1, where the plurality of wound layers includes a first plurality of wound layers and a second plurality of wound layers and where the discrete filler material is located between the first plurality of wound layers and the second plurality of wound layers.

* * * * *